US007475059B2

(12) United States Patent
Irle et al.

(10) Patent No.: US 7,475,059 B2
(45) Date of Patent: Jan. 6, 2009

(54) ADAPTING BUSINESS OBJECTS FOR SEARCHES AND SEARCHING ADAPTED BUSINESS OBJECTS

(75) Inventors: Klaus Irle, Walldorf (DE); Uwe Kindsvogel, Ubstadt-Weiher (DE); Tatjana Janssen, Bad Nenndorf (DE); Liwei Lu, Konstanz (DE)

(73) Assignee: SAP AG, Walldorf (DE)

( * ) Notice: Subject to any disclaimer, the term of this patent is extended or adjusted under 35 U.S.C. 154(b) by 400 days.

(21) Appl. No.: 10/367,116

(22) Filed: Feb. 13, 2003

(65) Prior Publication Data

US 2004/0162815 A1    Aug. 19, 2004

(51) Int. Cl.
*G06F 17/30* (2006.01)
(52) U.S. Cl. .................... 707/3; 707/1; 707/2
(58) Field of Classification Search .......... 707/1–5; 705/14; 717/100–103
See application file for complete search history.

(56) References Cited

U.S. PATENT DOCUMENTS

| | | | | |
|---|---|---|---|---|
| 6,094,649 | A * | 7/2000 | Bowen et al. .................. | 707/3 |
| 6,789,252 | B1 * | 9/2004 | Burke et al. ................. | 717/100 |
| 2002/0169583 | A1 | 11/2002 | Gutta et al. | |
| 2003/0078838 | A1 * | 4/2003 | Szmanda ..................... | 705/14 |
| 2004/0083213 | A1 * | 4/2004 | Wu et al. ....................... | 707/4 |
| 2004/0162816 | A1 | 8/2004 | Irle et al. | |
| 2004/0165816 | A1 | 8/2004 | Irle et al. | |

OTHER PUBLICATIONS

"Oracle Text," Mar. 2002, retrieved from the Internet on Jul. 30, 2004, at http://otn.oracle.com/products/text/pdf/9ir2text_bwp_f.pdf, XP002290925, 22 pgs.
"Oracle Ultra Search," Feb. 2002, retrieved from Internet on Jul. 30, 2004, at http://otn.oracle.com/products/ultrasearch/pdf/ultrasearch902_tech_wp.pdf, XP002290922, 21 pgs.
Raghavan, Prabhakar, "Structured and Unstructured Search in Enterprises," Bulletin of the Technical Committee on Data Engineering, v. 24, No. 4, pp. 15-18, XP002290923.

(Continued)

*Primary Examiner*—Don Wong
*Assistant Examiner*—Sheree N Brown
(74) *Attorney, Agent, or Firm*—Schwegman, Lundberg & Woessner, P.A.

(57) ABSTRACT

Methods and apparatus, including computer program products, for performing text and attribute searches of data stores that include business objects and for searching business objects. A computer-implemented method, for adapting business objects for text searches, includes retrieving attribute data from a business object and storing the attribute data as linear text content of the business object. A computer program product, for searching business objects, includes instructions operable to cause a processor to receive search criteria. The product includes instructions to access a linear text of a business object, the linear text including attribute data from the business object. The product includes instructions to search the linear text to identify the received search criteria. The product is tangibly stored on machine-readable medium.

26 Claims, 10 Drawing Sheets

OTHER PUBLICATIONS

Meng, W., et al., "Building Efficient and Effective Metasearch Engines," *ACM Computing Surveys*, New York, USA, v. 34, No. 1, pp. 48-89, XP002284747.

Rappoport, A., "Search Engines: The Hunt Is On," *Network Computing*, Oct. 16, 2000, retrieved from the Internet on Jul. 30, 2004, at http://www.nwc.com/1120/1120f1.html, pp. 1-9, XP002290924.

"Verity K2 Architecture," Jul. 2002, retrieved from the Internet on Aug. 2, 2004, at http://www.verity.com/pdf/white_papers/MK0366a_K2Arch_WP.pdf, pp. 1-10, XP002290926.

Baeza-Yates, R., et al. 'Indexing and Searching' in *Modern Information Rretrieval*, Addison Wesley, GB, p. 191, XP003211061.

\* cited by examiner

SAP Portals Enterprise Portal 5.0 - Microsoft Internet Explorer provided by SAP IT File   Edit   View   Favorites   Tools   Help

*The Right Technology.
Right Away.™*

►Welcome, Sabine Stern
Personalize: Page|Portal

Home | Information | My Pages | My Work | WebEx | Product | Asset | Project | Collaboration My News • My Info • My Work • Personal • Self Services • Travel Search: [         ] Search
Advanced Search

Advanced Search Overview

Help

Results

Sort by Relevance

SAP AG
100% Supplier Nr. 54367
69190 Walldorf, Deutschland, Neurottstr. 16, Tel: +49/62 27/7 1 23 45, Fax: +49/62 27/77 23 44 67, E-mail:receptionXYZ@sap.com
| Edit | Add to Favorites |
Last modified 05.06.02   by Sabine Stern SAP CRM
100% Supplier Nr. 54368
69190 Walldorf, Deutechland, Neurottstr. 16, Tel: +49/62 27/7-1 23-32, Fax: +49/62 27/77-23 44 34, E-mail:receptionABC@sap.com
| Edit | Add to Favorites |
Last modified 17.00.00   by Ulrich Pried SAP LGD
100% Supplier Nr. 54369
69190 Walldorf, Deutschland, Neurottstr. 16, Tel: +49/62 27/7-1 23-32, Fax: +49/62 27/77-23 44 34, E-mail:receptionABC@sap.com
| Edit | Add to Favorites |
Last modified 21.11.01   by Sabine Stern SAP PLM
100% Supplier Nr. 54421
69190 Walldorf, Deutschland, Neurottstr. 16, Tel: +49/62 27/7-1 23-45, Fax: +49/62 27/77-23 44 67, E-mail:receptionXYZ@sap.com
| Edit | Add to Favorites |
Last modified 05.06.02   by John Bear SAP SCM
100% Supplier Nr. 54573
69190 Walldorf, Deutschland, Neurottstr. 16, Tel: +49/62 27/7-1 23-45, Fax: +49/62 27/77-23 44 67, E-mail:receptionXYZ@sap.com
| Edit | Add to Favorites |
Last modified 05.06.02   by Sabine Stern Results  more...

↑Top

*FIG. 6D*

ADAPTING BUSINESS OBJECTS FOR SEARCHES AND SEARCHING ADAPTED BUSINESS OBJECTS

BACKGROUND

The present invention relates to searches of data objects.

Enterprise computer systems, such as, for example, the R/3 System available from SAP AG, of Walldorf, Germany, usually include and process business objects. Business objects are data objects that relate to some business process of an enterprise. Business objects can represent, for example, material master records, equipment, business partners, and so forth.

Generally, a business object includes attributes, which can form a significant part of the content of the business object. An attribute can be named and can include values. For example, an attribute named business partner can include a text string value "SAP AG". Attribute values can also include numeric values, as well as any other type of data that can be generally incorporated into a data object. Furthermore, the attributes of a business object can be structured relative to one another. For example, a first attribute can be associated with one or more child attributes. A collection of related attributes can be grouped as a set. For example, attributes that describe a product configuration can be grouped.

Business objects can be of different types, with each type relating to some particular business process. A material master, for example, is one type of business object. A business partner, such as, for example, a supplier, is another example of a particular type of business object.

SUMMARY

The present invention provides methods and apparatus, including computer program products, for performing text and attribute searches of data stores that include business objects.

In general, in one aspect a computer-implemented method, for adapting business objects for text searches, includes retrieving attribute data from a business object. The method includes storing the attribute data as linear text content of the business object.

In general, in another aspect a computer program product, for adapting business objects for text searches, includes instructions operable to cause a processor to retrieve attribute data of a business object. The product includes instructions to store the attribute data as linear text content of the business object.

In general, in another aspect a computer program product, for searching business objects, includes instructions operable to cause a processor to receive search criteria. The product includes instructions to access a linear text of a business object, the linear text including attribute data from the business object. The product includes instructions to search the linear text to identify the received search criteria. The product is tangibly stored on machine-readable medium.

The invention can be implemented to realize one or more of the following advantages. A system as described facilitates searches of business objects. The system can perform a text search, an attribute search, and a combination of a text search and an attribute search for business objects. A user using the system can search business objects without having to know the data model or the specific implementations of the business objects. For example, the user need not know the attribute names or attribute structures of business objects the user is searching. In response to one search request, the system can search multiple and different back-end components or data stores. The system can, furthermore, search data stores of heterogeneous systems. In response to one search request, the system can search for different types of data objects. The data objects searched for can be, for example, business objects, objects that represent Web-pages, and documents. In response to one search, the system can search all attributes of business objects, thus, significantly facilitating multiple attribute searches. The system not only allows searches as described above, but can also provide access to the results of a search. The system allows, for example, the user to edit a business object found during a search and, furthermore, add the business object to a favorite list. The system can provide only results that the user is authorized to access. The system can adapt business objects for text searches. The adapted business objects can be indexed for either a text search or an attribute search. Unlike conventional search engines, which discard common words, the system, in one implementation, does not discard words when adapting and indexing business objects for text searches. Consequently, the system, in searching for a business object that satisfies a condition, can dispositively show that such business object does not exist in the data stores. The system can provide a single user interface for performing the operations described above, including, for example, searching multiple and different data stores. The user, hence, does not have to use different user interfaces to, for example, search different data stores. The system can reduce the processing and memory load on backend components by shifting these loads to search engines. The system can accomplish the shift by having the search engines store indices of data in the database and, furthermore, search the indices. Database applications residing on the backend components need not search their databases. Search engines can usually search faster than can database applications. By having the search engines perform the searches instead of the database applications, the system reduces search time.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 6A-E show an example user interface for performing an advanced search.

Like reference numbers and designations in the various drawings indicate like elements.

DETAILED DESCRIPTION

Figure 1:
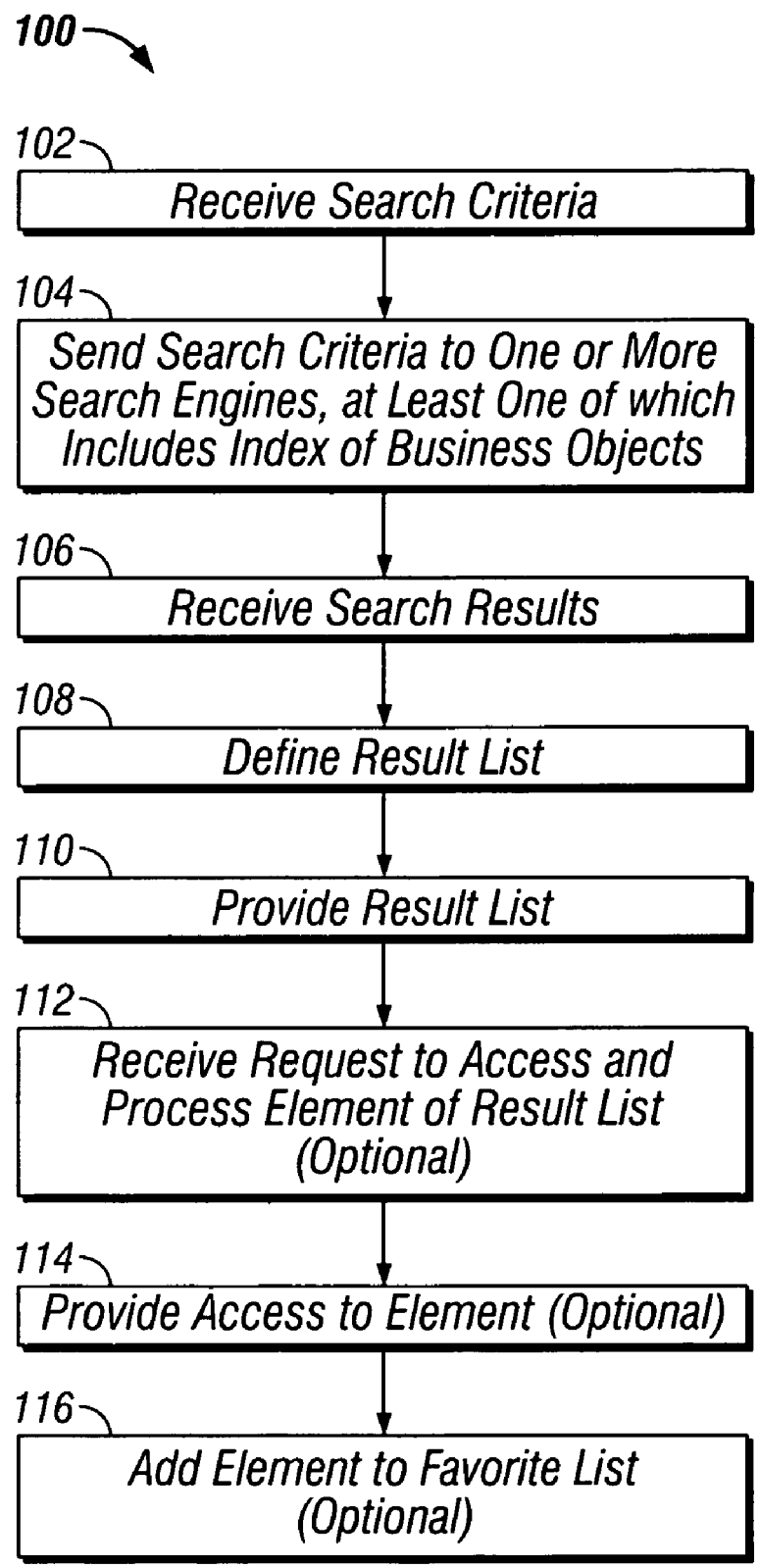
FIG. 1 shows a method for searching data stores that include business objects.

FIG. 1 shows a method 100 for searching data stores that include business objects. A system performing method 100 receives search criteria (step 102). The search criteria can include one or more conditions. The one or more conditions can include a format-based condition, a format-free condition, or any combination of format-based and format-free conditions. One example format-based condition can specify that a particular attribute must have a particular value, value range, or lack a particular value. For example, a condition can specify that an attribute named engine size includes the numeric value "5.0". One example format-free condition can specify that a data object must include a particular string of characters anywhere in the business object's content. For example, a condition can specify that a business object includes the text string "Irle".

The search criteria need not be limited to conditions that are specific to business objects. Rather, the search criteria can include conditions that are applicable to all data objects, including for example, data objects that represents Web pages or documents.

The system sends the search criteria to one or more search engines (step 104). The search engines can be implemented as a part of the system. Alternatively, the search engines can be external to the system but, nevertheless, work in conjunction with the system. The search engines can, but need not, be of heterogeneous systems. For example, the one or more search engines can include a first search engine that is located on a first type of computing system and a second search engine that is located on a second type of computing system. The search engines can be maintained by one enterprise or a combination of different enterprises. The search engines can include, for example, those that are maintained by a supplier, a manufacturer, and a retailer. At least one of the search engines includes one or more indices for business objects. The indices can include an index of one or more attributes of the business objects. The indices can also include an index of the linear text content of the business objects. In general, indices for business objects can include an index of any portion of the business objects. The search engines can include indices of data stores from multiple and heterogeneous back-end components. The search engines can include indices for, by way of example, Web pages and documents.

The search engines can perform any type of searches, including a full text search, an attribute search or a short text search, a long text search, a fuzzy search, a linguistic search, a phonetic search, a similarity search, and any combination of the mentioned searches. The search engines can support wild cards, Boolean operators, and, furthermore, be case sensitive or case insensitive. A full text search searches the entire content of a data object, including attributes and a long text portion of the data object. The attribute search searches only the attributes of the data object. The long text search searches only the long text portion of the data object. The fuzzy search returns results that do not exactly match the search criteria. For example, the fuzzy search can find strings that include typographical errors. The linguistic search uses the principal form of a word to search. For example, a linguistic search for house returns houses and housing. The phonetic search returns results that sound like a search word specified in the search criteria. For example, a search for Smith returns Smythe, Smithe, and Smyth. The similarity search finds data objects that are similar to the one specified in the search criteria. As noted, the search engine can perform other types of searches.

The system can send the search criteria through a network. The network can include a public network, an enterprise network, or any combination of both public and enterprise networks.

The system can receive the search criteria from a user, which can be one or more human operators, one or more computing entities such as a computer program product, and any combination of input from human operators and computing entities.

When the search engines complete their searches, the system receives the search results (step 106). Receiving search results can include a data pull function, a data push function, or a combination of the data pull and push functions. These functions can coordinate the sending of search criteria and search results. The system can include one or more application interfaces that implements these functions.

The system defines a result list (step 108). Defining a result list can include ordering search results received from the search engines. The order can be based on relevance. The defining of a result list, in this case, can include an assessment of relevance. Defining a result list can also include filtering out search results that represent data objects to which a user initiating the search lacks authorization to access.

The system provides a result list (step 110). The system can, for example, display the result list through a user interface. The user interface can be, for example, a portal.

When the system receives requests to access and process the elements of a result list (step 112), the system provides access to and processing of the corresponding business objects (step 114). In response to user input, the system can also add elements of the result list to a favorite list of the user (step 116). The system can provide features that allow the user to access and process elements of the result list. In one implementation, the system can present an icon in the result list, which selection provides access to and processing of a corresponding business object. The system can include, for example, icons for viewing and editing the business object. The system can also provide a feature to add an element of the result list to a favorite list of the user.

Figure 2:
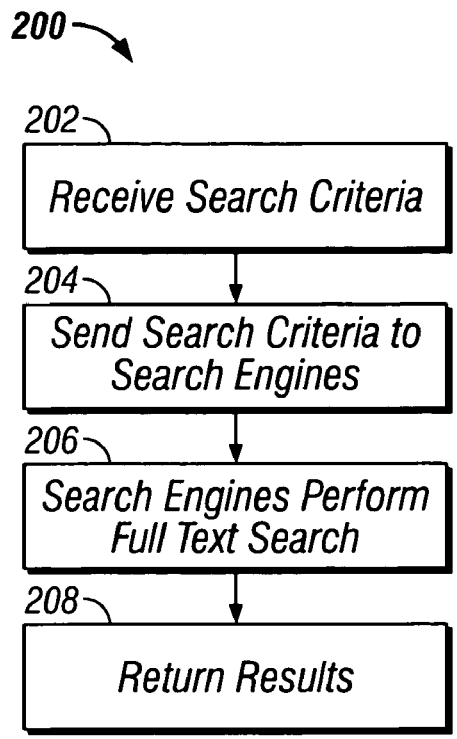
FIG. 2 shows an alternative method for searching data stores that include business objects.

FIG. 2 shows an alternative method 200 for searching data stores that include business objects. The implementation shown performs a simple search. The system receives search criteria (step 202). The search criteria include one or more form-free conditions that can include one or more text strings. The search criteria can be received from a human operator using a client computer and accessing the system through a portal.

The system sends the search criteria to one or more search engines (step 204). The search engines perform a full text search (step 206). Alternatively, the search engines can perform a long text search in cases where the long text portion of a business object includes all the attribute data of the business object that have been unstructured and stored as a linear version of the entire attribute content of the business object. In these cases, the long text search is equivalent to a full text search. The search engines can each include an index of a long text portion of business objects of their respective data stores. When the long text portions include the linear version of attribute data, the long text indices include all attribute data. The system returns the results of the search (step 208).

Figure 3:
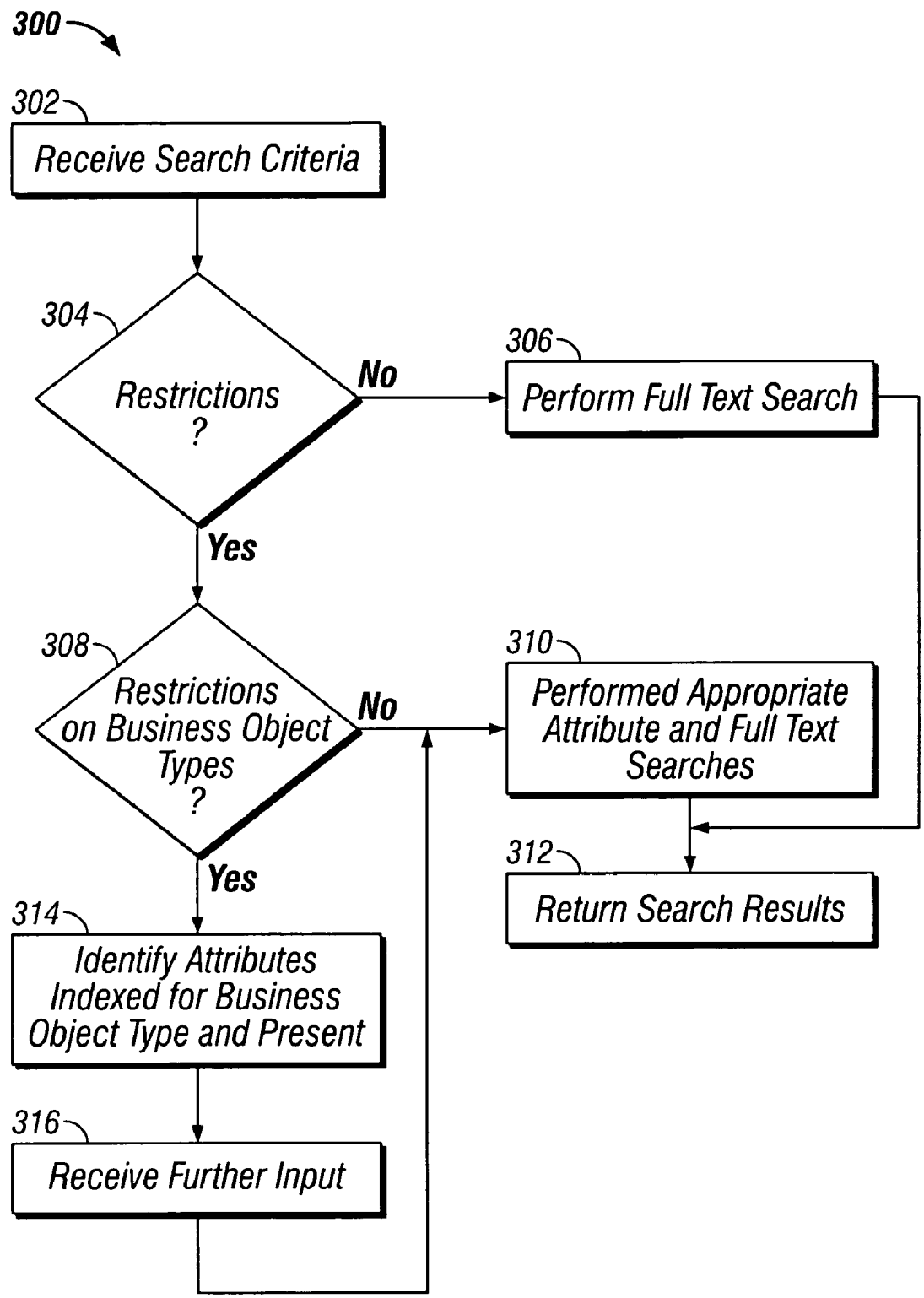
FIG. 3 shows another method for searching data stores that include business objects.

FIG. 3 shows another method 300 for searching data stores that include business objects. The implementation shown performs an advanced search. In this implementation, data objects that are business objects have attributes and a long text portion. The long text portion can include a linear text string of attribute data. Of the attributes, there are generic attributes that are included in all business objects in the system. There are also non-generic attributes that are included in only particular types of business objects.

The system receives search criteria (step 302). The search criteria can include format-free conditions specifying, for example, that a data object includes a particular text-string. The search criteria can also include format-based conditions specifying, for example, that particular attributes. have particular values or ranges of values. Format-based conditions can be specified with Boolean logic, using operators such as, for example, AND, OR, NOT, or any combination of these. In this implementation, format-based conditions are referred to as restrictions. Other types of restrictions can specify, for example, that the data objects be of a particular type of business object.

The system determines if the search criteria include restrictions (decision step 304). That is, the system checks if the search criteria includes format-based restrictions or restrictions to a particular type of business object. If there are no restrictions, the system performs a full text search (step 306). If the long text search includes the linear text string of attribute data, then the system can perform a long text search.

If there are restrictions, then the system determines whether there are restrictions to particular types of business objects (decision step 308). If there are no restrictions to particular types of business objects, then the only restrictions pertain to generic attributes. The system performs an attribute search and a full text search in accordance to the search criteria (step 310). The system can perform these searches in parallel and then combine their results. The system returns the search results (step 312). If there are restrictions to particular types of business objects, the system identifies and presents, for the particular types of business objects specified in the search criteria, the attributes that have been indexed and, hence, available for searching (step 314). The system receives further input (step 316). The further input includes one or more conditions relating to the attributes identified in step 314. In response to the further input, the system performs steps 310 and 312 as described above.

Figure 4:
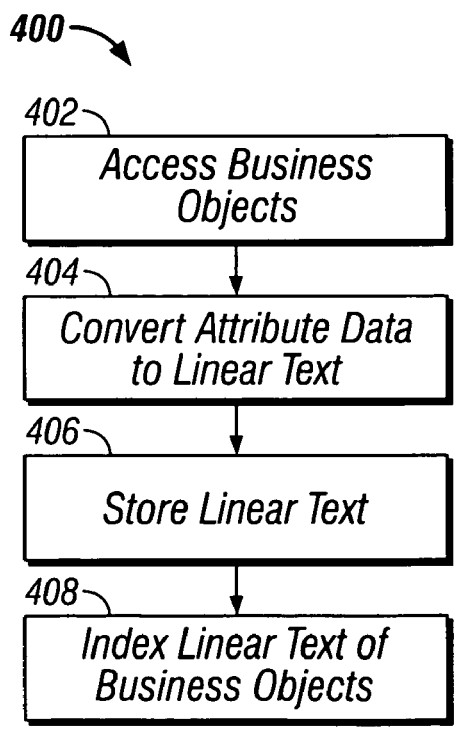
FIG. 4 shows a method for adapting business objects for performing searches as described in this specification.

FIG. 4 shows a method 400 of adapting business objects for performing searches as described in this specification. A system performing method 400 accesses the business objects being adapted (step 402). Accessing can include retrieving attribute data from the content of the business objects. The system converts the attribute data into linear text (step 404). The linear text can take the form of, for example, a linear text string or a linear text file. Converting can include unrolling the attribute structure and then retrieving attribute data in the unrolled attribute structure. Examples of attributes that the system can unroll include standard fields and customer specific extensions, including customer defined fields to standard tables, customer defined tables, and customer specific data clusters.

The system stores the linear text (step 406). Storing can include storing linear text strings or files as content of data objects. As discussed, when this technique is implemented, the linear text of a business object includes all attribute data of the business object. The system indexes the linear text content of the adapted business objects (step 408).

Figure 5:
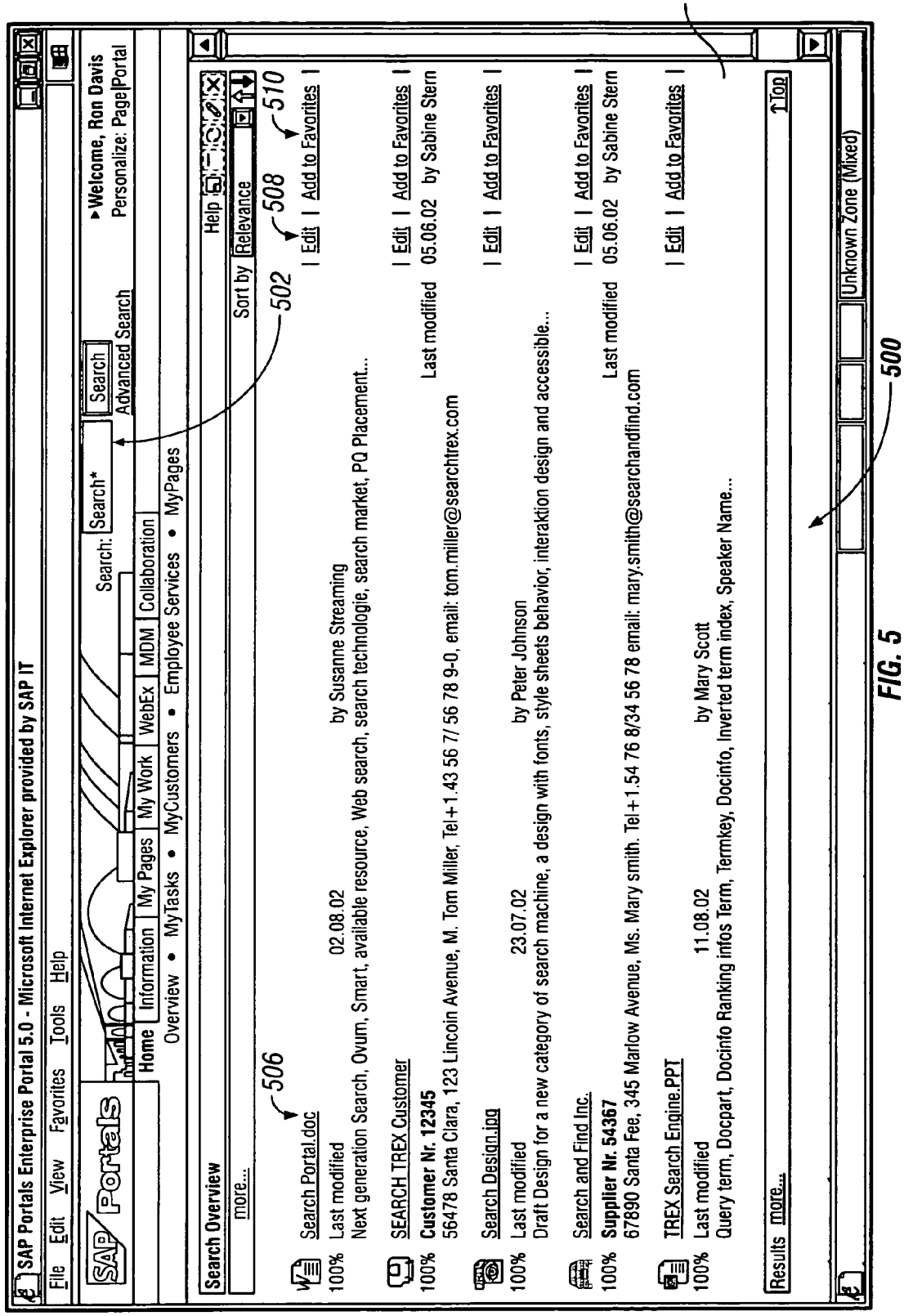
FIG. 5 shows an example user interface for performing a simple search.

FIG. 5 shows an example user interface 500 for performing the simple search described above. The user interface 500 is a unified user interface and can be a portal. The search field can be a simple input field 502, into which a human operator can type a text string. The user interface 500 can also include an area 504 for presenting a result list. Each element of the result list can include a feature for accessing the corresponding data object. For example, the elements each include a link such as link 506, which selection allows the user to access the data object. The user interface 500 can also include selectable commands, such as selectable commands 508 and 510, which selection allows the user to edit and add, respectively, the corresponding business object to the user's favorite list. The result list can and does, in this example shown, include more than one type of data objects. For example, the first element is a document while the second element is a business object.

Figure 6A:
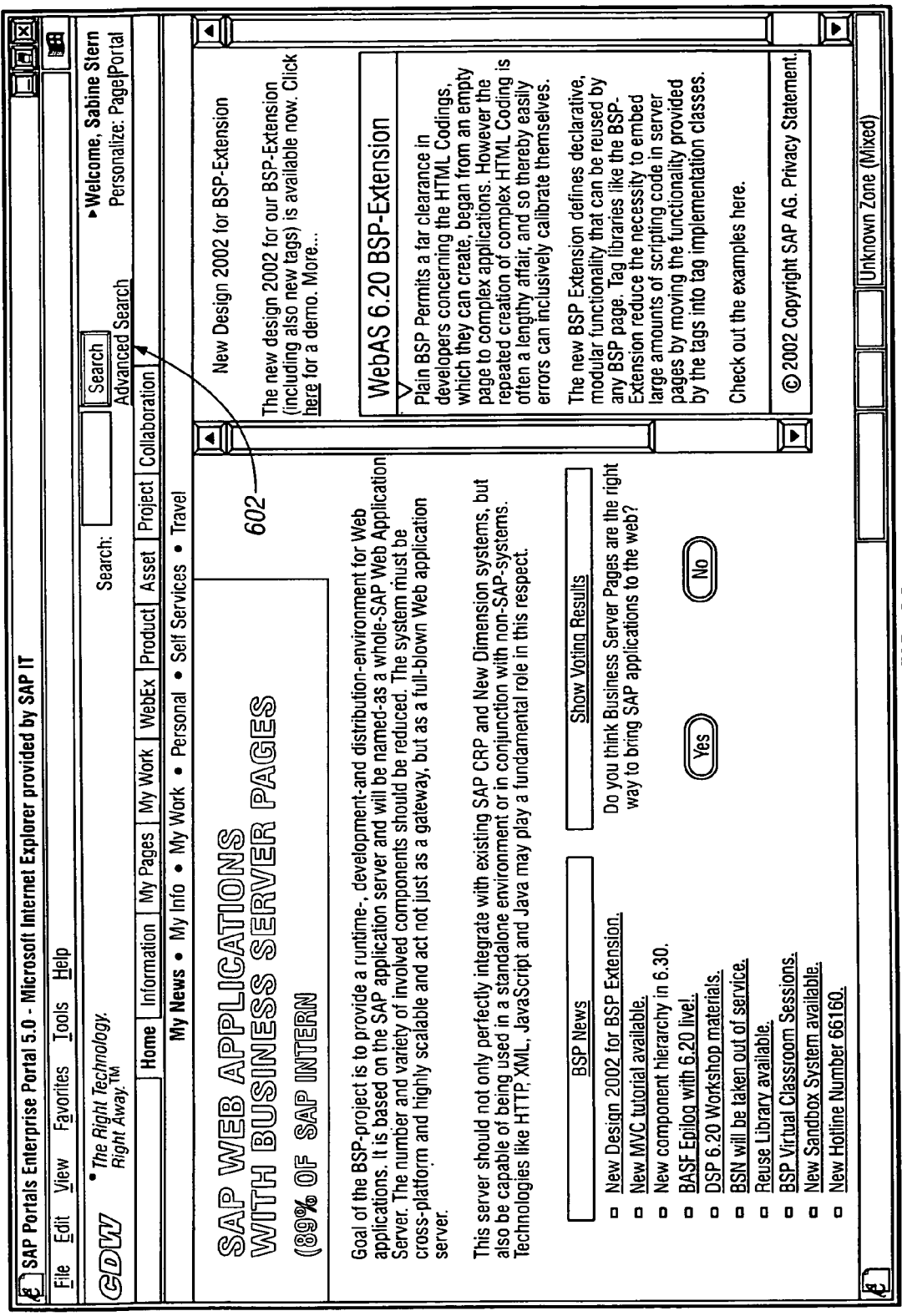
Figure 6B:
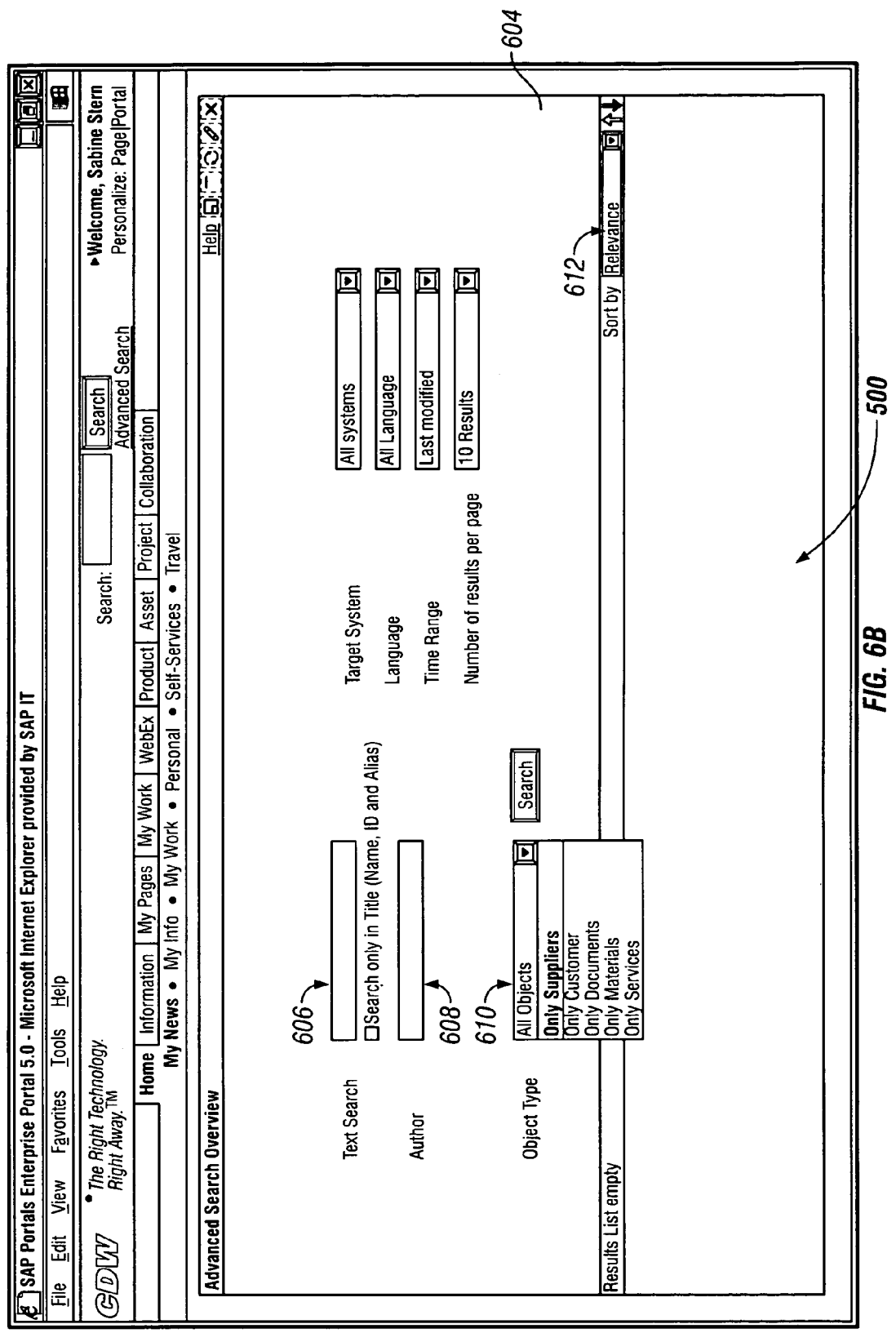
Figure 6C:
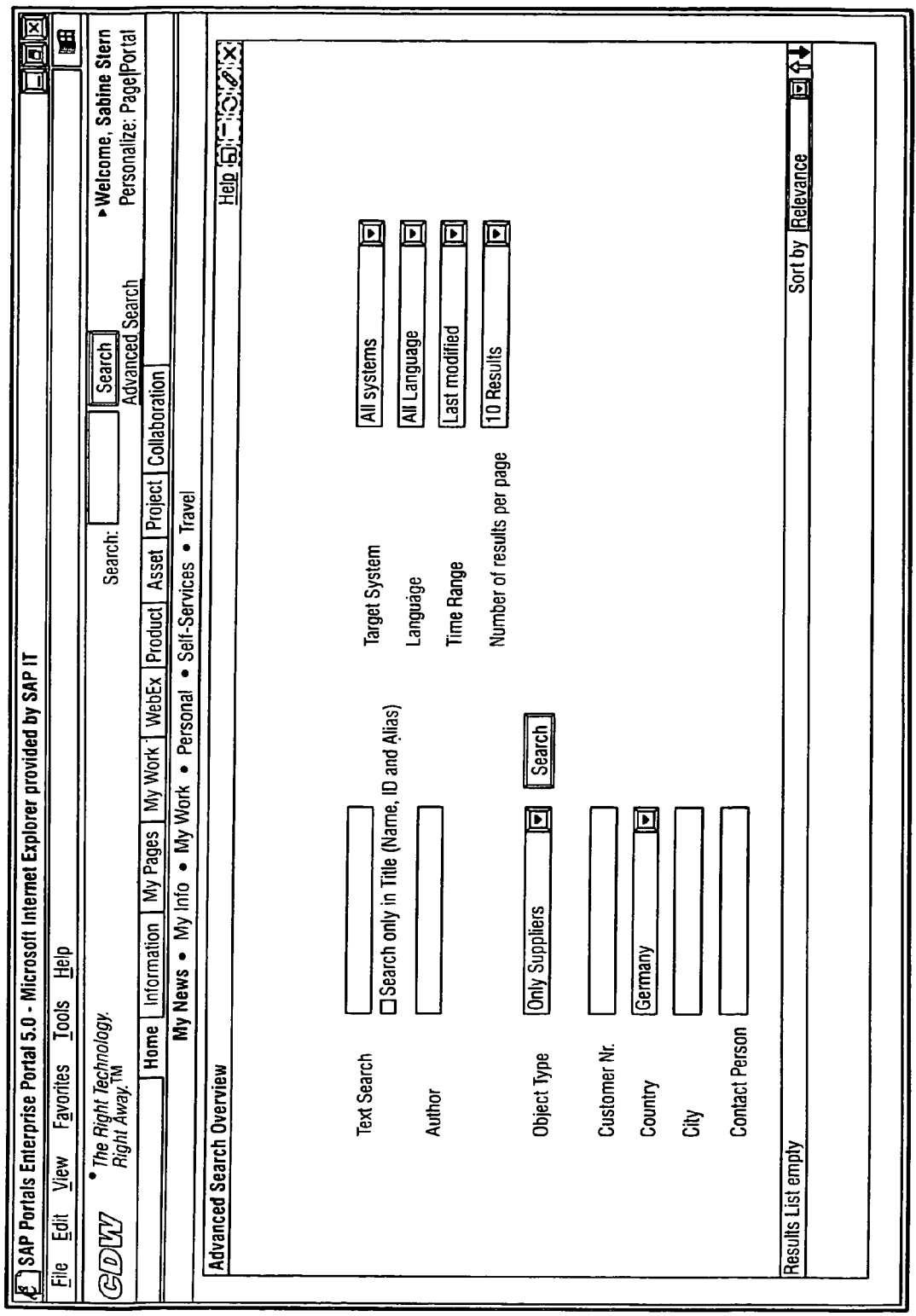
Figure 6E:
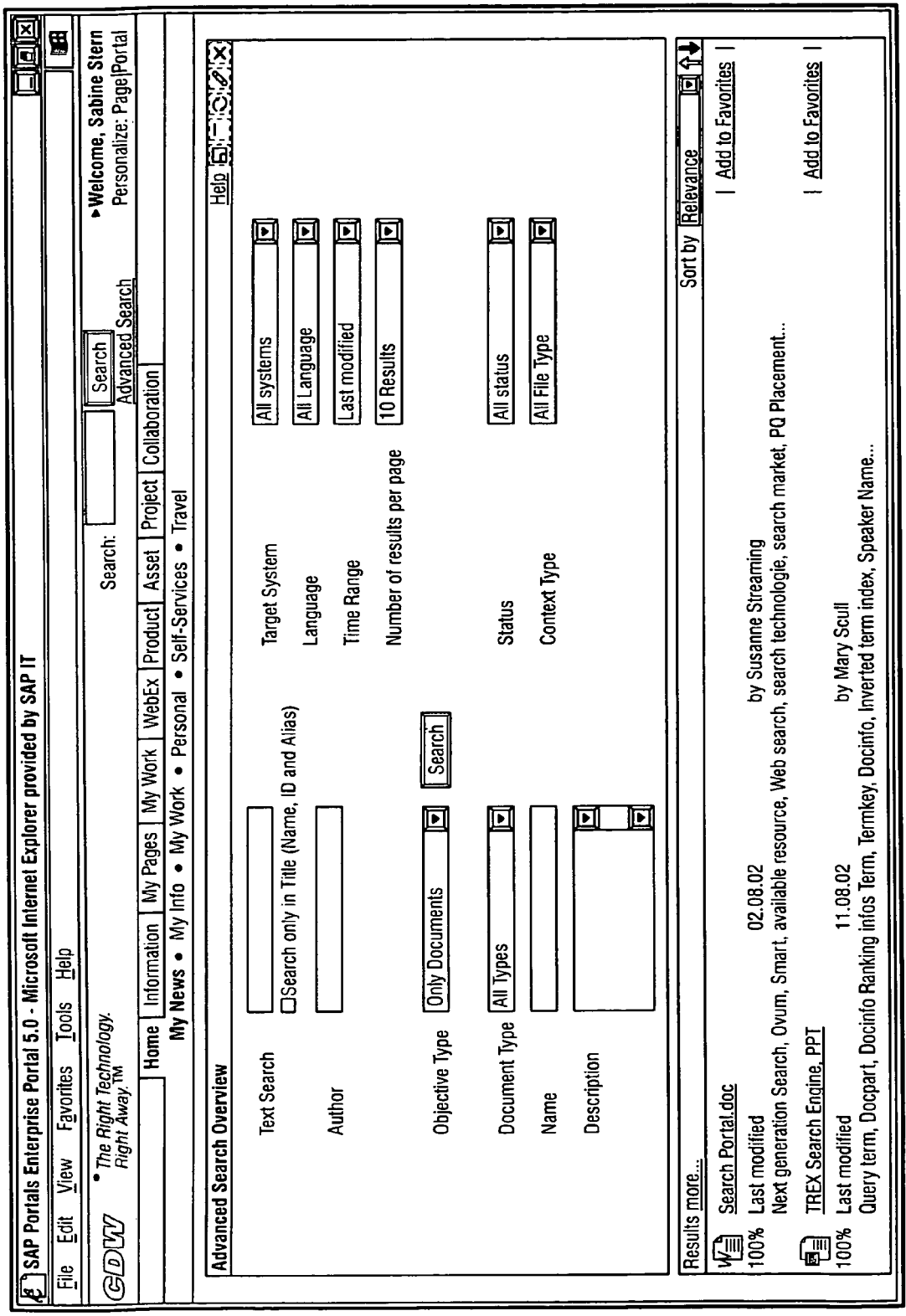

FIGS. 6A-E show an example of a unified user interface for performing an advanced search. FIG. 6A shows a portal that provides simple and advanced search functions. A user can select the advanced search function by selecting the advanced command 602. FIG. 6B shows the advanced search view 604, which is presented in response to a selection of the advanced command 602. The advanced search view 604 includes an input field 606 for receiving text strings, input fields such as input field 608 for receiving attribute values, an input field such as input filed 610 for receiving input that specifies business object types. The view 604 also includes an input field 612 for determining how elements of the result lists are sorted. FIG. 6C illustrates an example scenario where the user specifies that data objects of interest include only business objects that are suppliers. In response, the system presents attributes that are specific to suppliers. These attributes include, for example, supplier number, country, city, and contact person. The user provides further search criteria by specifying Germany as the country of interest. The system searches for business objects that are suppliers and that are located in Germany. FIG. 6D shows an example result list for the scenario described. The result list includes features which selection allows access to and processing of business objects listed. FIG. 6E illustrates another scenario, in which the user specifies that only documents, and not business objects, are of interest. The system returns a result list that includes only documents.

Figure 7:
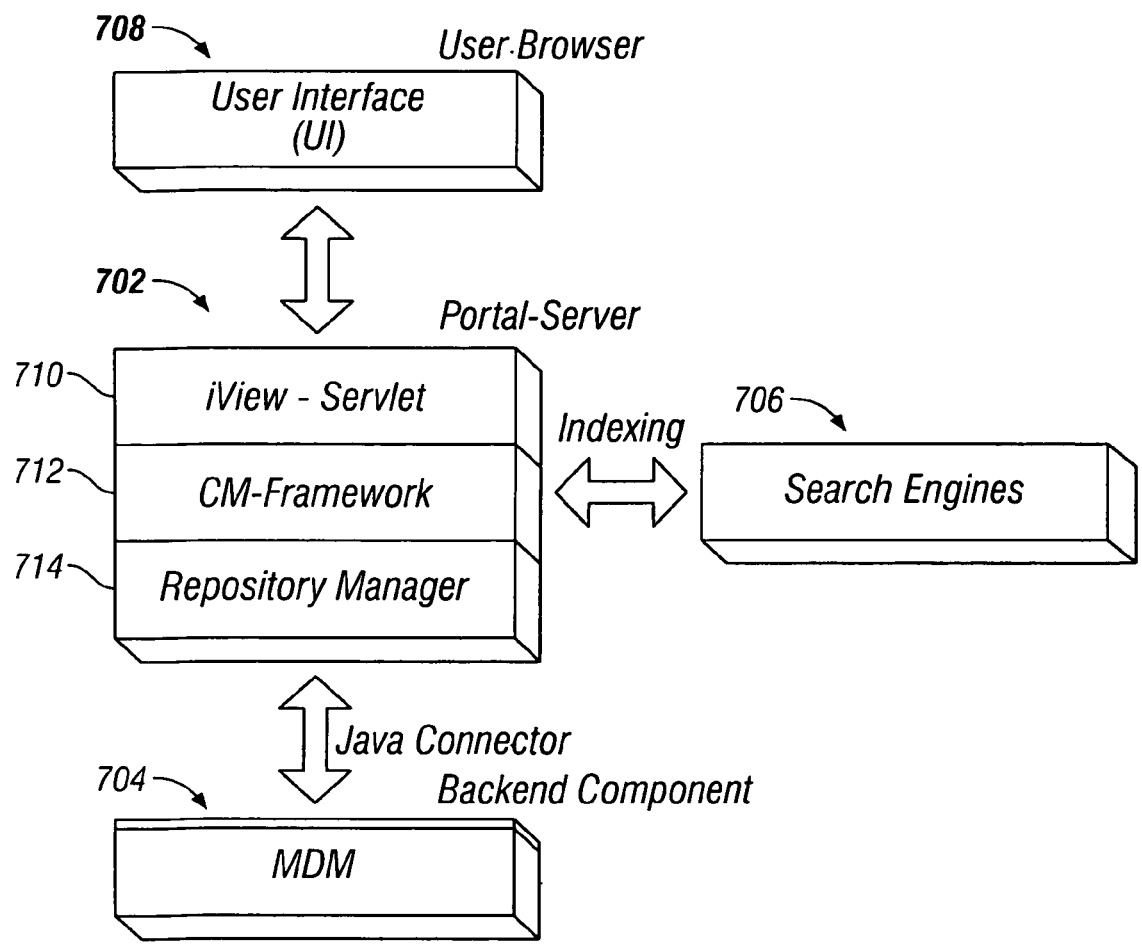
FIG. 7 shows one implementation of a system for searching business objects.

FIG. 7 shows one implementation of a system for searching business objects. The system can include a portal server 702, a back-end component 704, and one or more search engines 706. The system can also include a user browser 708 that is located at a font-end component. The portal server 702 can include an iView servlet 710 that provides the search functions to the portal user. In one implementation, the iView servlet can include computer-program products that provide the unified user interface described above. iViews are applications that generate a view in a portal and, furthermore, that provides one or more functions. iViews are available from SAP AG. The portal server 702 can also include a content manager ("CM") 712 that provides a framework for exchanging data across different applications. The portal server 702 can also include a repository manager 714 that coordinates the storage of data objects. The portal server can also include application interfaces (not shown) for interfacing with the search engines 706.

The search engines 706 perform the searches. The search engines can include indices of attributes of data objects, long text portions of data objects, or any combination of attributes and long text portions. Example of search engines can include the TREX search engine available from SAP AG, as well as any other search engine.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, or embodied in a propagated signal, or embodied in any combination of the machine-readable storage device and the propagated signal. Method steps of the invention can be performed by a programmable processor executing a program of instructions to perform functions of the invention by operating on input data and generating output. The invention can be implemented advantageously in one or more computer programs that are executable on a programmable system that can include at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention can be implemented in a computer system that can include a back-end component, such as a data server. The system can also include a middleware component, such as an application server or an Internet server. The system can also include a front-end component, such as a client computer having a graphical user interface or an Internet browser. The components of the system can be connected by links, networks, or any combination of both.

The invention has been described in terms of particular embodiments. Other implementations are within the scope of the following claims. For example, the steps of the invention can be performed in a different order and still achieve desirable results. The system can search for any types of business objects and is not limited to those examples described. The system can include or work in conjunction with any search engines and is not limited to the example search engines described. The system can index all or any portion of a data object. For example, when a data object includes many attributes, for example, over a hundred, the system indexes only the long text field of the data object. When a data objects includes few attributes, for example, fewer than 100 attributes, the system can index the attribute data as well as the long text portion. The system can include one or more application program interfaces so that the functions described above can be implemented into any applications, including those applications that do not support input or output devices. Not all attributes of data objects in a data store need to be indexed. The system allows an administrator to select which attributes to index.

What is claimed is:

1. A method comprising:
accessing a business object by retrieving attribute data from the business object, the attribute data comprising standard fields and customer-specific extensions, the customer-specific extensions comprising fields defined by customers and tables defined by customers, the retrieving attribute data including converting the attribute data of the business object to linear text, the converting the attribute data including unrolling a combination of the standard fields and the customer-specific extensions within the business object;
storing the linear text as linear text content of the business object;
receiving search criteria;
determining that at least a portion of the linear text content of the business object matches the search criteria;
providing write access to the business object;
after the determining, presenting the business object along with selectable commands that enable editing of the linear text content of the business object.

2. The method of claim 1, wherein unrolling customer-specific extensions includes unrolling any combination of the fields defined by customers, the tables defined by customers, and customer-specific data clusters.

3. The method of claim 1, further comprising:
retrieving attribute data from business objects of different types.

4. The method of claim 1, wherein storing the linear text as linear text content of the business object includes storing the linear text as a linear text file that is included in the business object.

5. The method of claim 4, further comprising:
indexing the linear text content of the business object.

6. The method of claim 4, further comprising:
indexing the linear text file included in the business object.

7. The method of claim 5, wherein indexing includes indexing all linear text content without discarding common words, whereby a search of a result of the index can exclude a particular business object.

8. A computer program product, tangibly stored on one or more machine-readable media, the product comprising instructions to configure a processor to:
access a business object by a retrieval of attribute data of the business object based, the attribute data comprising standard fields and customer-specific extensions, the customer-specific extensions comprising fields defined by customers and tables defined by customers, the retrieval of attribute data including to convert the attribute data of the business object to linear text, the conversion of the attribute data including to unroll a combination of the standard fields and the customer-specific extensions within the business object;
store the linear text as linear text content of the business object;
receive search criteria;
determine that at least a portion of the linear text content of the business object matches the search criteria;
provide write access to the business object;
after the determine, present the business object along with selectable commands that enable editing of the linear text content of the business object.

9. The computer program product of claim 8, wherein the instructions configure the processor to:
unroll any combinations of the fields defined by customers, the tables defined by customers, and customer-specific data clusters.

10. The computer program product of claim 8, wherein the instructions configure the processor to:
retrieve attribute data from business objects of different classes.

11. The computer program product of claim 8, wherein the instructions configure the processor to:
store the linear text as a linear text file that is included in the business object.

12. The computer program product of claim 11, wherein the instructions configure the processor to:
index the linear text file included in the business object.

13. The computer program product of claim 8, wherein the instructions configure the processor to:
index the linear text content of the business object.

14. The computer program product of claim 13, wherein the instructions configure the processor to:
　　index all linear text content without discarding common words, whereby a search of a result of the index can exclude a particular business object.

15. A computer program product, tangibly stored on a machine-readable medium, comprising instructions to configure a processor to:
　　receive search criteria comprising a search word;
　　access linear text of a business object, the linear text including attribute data from the business object;
　　search the linear text to identify the search criteria according to at least two different searches selected from a group consisting of a text search, a fuzzy search that can find strings that include typographical errors, a linguistic search that uses a principal form of the search word, a phonetic search that returns results that sound like the search word, and a similarity search that finds a data object similar to a data object specified in the search criteria;
　　combine search results produced by the at least two different searches;
　　present the search results along with selectable commands that enable editing of the linear text of one or more of the search results;
　　receive a request to edit the business object; and
　　provide write access to the business object.

16. The computer program product of claim 15, wherein accessing the linear text comprises accessing all attribute data from the business object.

17. The computer program product of claim 15, wherein the instructions configure the processor to:
　　access an index of linear text, the index indexing the linear text of the business object.

18. The computer program product of claim 17, wherein the instructions configure the processor to:
　　index the index of linear text for searching.

19. The computer program product of claim 15, wherein the instructions configure the processor to:
　　receive a restriction specifying a format-dependent condition of a business object as the search criteria.

20. The computer program product of claim 19, wherein the restriction specifies that the business object is of a particular class of business object.

21. The computer program product of claim 19, wherein the instructions configure the processor to:
　　send the restriction to at least one search engine that accesses an index of business objects.

22. The computer program product of claim 15, wherein the instructions configure the processor to:
　　provide the search criteria to a search engine that accesses the linear text of the business object.

23. The computer program product of claim 15, wherein the instructions configure the processor to:
　　provide the search criteria to heterogeneous search engines, at least one of the heterogeneous search engines accessing the linear text of the business object.

24. The computer program product of claim 15, wherein the instructions configure the processor to:
　　provide write access to the linear text of the business object.

25. The computer program product of claim 15, wherein the instructions configure the processor to:
　　amend the linear text of the business object to be in accordance with an edit of the business object.

26. The computer program product of claim 15, wherein configure the processor to:
　　access second linear text of a second business object, the second business object being a different class of business object from the business object; and
　　search the second linear text to identify the received search criteria.

* * * * *